(12) United States Patent
Kim (10) Patent No.: US 11,106,214 B2
(45) Date of Patent: Aug. 31, 2021

(54) ARTIFICIAL NEURAL NETWORK-BASED PROJECTION INFORMATION RECOGNITION APPARATUS AND METHOD THEREOF

(71) Applicants: HYUNDAI MOTOR COMPANY, Seoul (KR); KIA MOTORS CORPORATION, Seoul (KR)

(72) Inventor: Young Hyun Kim, Seoul (KR)

(73) Assignees: Hyundai Motor Company, Seoul (KR); KIA Motors Corporation, Seoul (KR)

( * ) Notice: Subject to any disclaimer, the term of this patent is extended or adjusted under 35 U.S.C. 154(b) by 123 days.

(21) Appl. No.: 16/555,069

(22) Filed: Aug. 29, 2019

(65) Prior Publication Data

US 2020/0371527 A1 Nov. 26, 2020

(30) Foreign Application Priority Data

May 21, 2019 (KR) ......................... 10-2019-0059207

(51) Int. Cl.
| | |
|---|---|
| *G05D 1/00* | (2006.01) |
| *G05D 1/02* | (2020.01) |
| *G06K 9/00* | (2006.01) |
| *G06K 9/62* | (2006.01) |
| *G06N 3/04* | (2006.01) |
| *G06N 3/08* | (2006.01) |
| *G08G 1/16* | (2006.01) |

(52) U.S. Cl.
CPC ......... *G05D 1/0246* (2013.01); *G05D 1/0088* (2013.01); *G06K 9/00369* (2013.01); *G06K 9/00798* (2013.01); *G06K 9/00805* (2013.01); *G06K 9/00825* (2013.01); *G06K 9/6256* (2013.01); *G08G 1/166* (2013.01); *G08G 1/167* (2013.01); *G06K 2209/23* (2013.01)

(58) Field of Classification Search
None
See application file for complete search history.

(56) References Cited

U.S. PATENT DOCUMENTS

| | | | |
|---|---|---|---|
| 2017/0289474 A1* | 10/2017 | Aoyama | H04N 5/2256 |
| 2019/0042860 A1* | 2/2019 | Lee | G06K 9/00798 |
| 2019/0088125 A1* | 3/2019 | Park | G08G 1/166 |
| 2019/0243371 A1* | 8/2019 | Nister | G05D 1/0231 |
| 2019/0370571 A1* | 12/2019 | Shin | G06T 7/70 |
| 2020/0057453 A1* | 2/2020 | Laws | B60W 10/20 |
| 2020/0110418 A1* | 4/2020 | Lee | G06K 9/00818 |
| 2020/0166943 A1* | 5/2020 | Lee | G05D 1/0246 |

(Continued)

*Primary Examiner* — Soo Shin (57) ABSTRACT

An artificial neural network-based projection information recognition apparatus for a vehicle is capable of learning information (projection information) projected on a road surface by a neighboring vehicle based on an artificial neural network and also recognizing information projected on a region of interest (ROI) determined based on a driving direction of the vehicle. The apparatus includes: an object detecting device to detect an object in an image based on a first Convolution Neural Network (CNN), a projection information classifying device to classify projection information located on a road surface among objects detected by the object detecting device, and a controller that recognizes the projection information located in a Region Of Interest (ROI).

20 Claims, 10 Drawing Sheets

(56) References Cited

U.S. PATENT DOCUMENTS

| | | | |
|---|---|---|---|
| 2020/0371527 A1* | 11/2020 | Kim | G05D 1/0088 |
| 2020/0394476 A1* | 12/2020 | Kim | G06K 9/00791 |
| 2021/0053561 A1* | 2/2021 | Beller | B60W 30/0953 |
| 2021/0055733 A1* | 2/2021 | Beller | G05D 1/0088 |

* cited by examiner

ARTIFICIAL NEURAL NETWORK-BASED PROJECTION INFORMATION RECOGNITION APPARATUS AND METHOD THEREOF

CROSS-REFERENCE TO RELATED APPLICATION

This application claims priority to and the benefit of Korean Patent Application No. 10-2019-0059207, filed on May 21, 2019, the entire contents of which are incorporated herein by reference.

FIELD

The present disclosure relates to a technique for recognizing information (projection information) projected on a road surface by a neighboring vehicle based on an artificial neural network.

BACKGROUND

The statements in this section merely provide background information related to the present disclosure and may not constitute prior art.

In general, deep learning or deep neural network is a kind of machine learning and includes several layers of artificial neural networks (ANNs) between an input and an output. Depending on structures, problems or purposes to be solved, such artificial neural networks may include a Convolution Neural Network (CNN) or a Recurrent Neural Network (RNN).

The deep learning is used to solve various problems such as classification, regression, localization, detection, segmentation, and the like. Particularly, in an autonomous driving system, semantic segmentation and object detection technologies have been used to identify the locations and types of dynamic or static obstacles.

The semantic segmentation refers to the partitioning of an image into several segmentations based on pixels having the same semantic meaning by performing classification and prediction on the pixels to find desired objects in the image, thus not only determining which objects are present in the image, but also accurately identifying the position of the pixel having the same meaning (the same object).

The object detection refers to classifying and predicting the types of objects in the image and finding the position information of the object by performing a regression prediction of the bounding box, thus identifying not only what kind of object is present in the image and but also the location information of the object, which is more than a simple classification.

Recently, to reduce or prevent a traffic accident, information projection techniques have been developed. For example, the direction information (e.g., turn signal information) of a vehicle, the status information (e.g., break information) of a vehicle, or the like is projected on a road surface in the form of a mark (e.g., a symbol, a character, or the like).

A driver of a vehicle may predict whether a preceding vehicle may make the left turn, the right turn, or stop such that it assists the safe driving of the vehicle. However, we have found that since this conventional technique relies on the driver recognition of the projected mark, this technique may not be used when a vehicle is operated in an autonomous driving mode in which the driver does not participate in the driving of the vehicle. Thus, the autonomous driving vehicle may not improve the driving safety by utilizing such the mark projected on the road surface by neighboring vehicles.

SUMMARY

An aspect of the present disclosure provides an artificial neural network-based projection information recognition apparatus and method, capable of learning information (projection information) projected on a road surface by a neighboring vehicle based on an artificial neural network and recognizing information projected on a region of interest (ROI) corresponding to a driving direction of a vehicle based on the learning, thus improving driving safety of the vehicle.

The technical problems to be solved by the present inventive concept are not limited to the aforementioned problems, and any other technical problems not mentioned herein will be clearly understood from the following description by those skilled in the art to which the present disclosure pertains. It will also be readily apparent that the objects and advantages of the disclosure may be realized by means of the instrumentalities and combinations particularly pointed out in the appended claims.

According to an aspect of the present disclosure, an artificial neural network-based projection information recognition apparatus includes: an object detecting device that detects an object in an image based on a first Convolution Neural Network (CNN), a projection information classifying device that classifies projection information located on a road surface among objects detected by the object detecting device, and a controller that recognizes projection information located in a Region Of Interest (ROI) corresponding to a driving direction of a vehicle based on the projection information classified by the projection information classifying device.

The controller may set a region of interest (ROI) in a left lane of the vehicle when a lane change to a left lane of the vehicle is requested. In this case, the controller may delay a timing of the lane change or reduce a speed of the vehicle before attempting the lane change when the projection information indicating a lane change of a neighboring vehicle is located in the region of interest (ROI).

The controller may set the ROI in a right lane of the vehicle when a lane change to a right lane of the vehicle is requested. In this case, the controller may delay a timing of the lane change or reduce a speed of the vehicle before attempting the lane change when the projection information indicating a lane change of a neighboring vehicle is located in the region of interest.

The controller may set the region of interest in a forward driving lane of the vehicle when the vehicle is requested to drive in a forward direction of the vehicle. In this case, the controller may reduce a speed of the vehicle when the projection information indicates that there is a pedestrian in the region of interest, and allow the vehicle to reduce its speed when the projection information indicates that a stopped vehicle is located in the region of interest.

The object detecting device may perform learning on an object in an image.

The projection information classifying device may classify pieces of the projection information located on a road surface based on a second CNN.

The projection information classifying device may perform learning on projection information located on a road surface, and distinguish the projection information projected on the road surface from a mark painted on the road surface in a learning process.

According to another aspect of the present disclosure, an artificial neural network-based projection information recognition method includes: detecting, by an object detecting device, an object in an image based on a first Convolution Neural Network (CNN); classifying, by a projection information classifying device, projection information located on a road surface among detected objects; and recognizing, by a controller, projection information located in a Region Of Interest (ROI) corresponding to a driving direction of a vehicle based on the classified projection information.

The recognizing of the projection information located in the region of interest corresponding to the driving direction of the vehicle may include: setting the region of interest in a left lane of the vehicle when a lane change to a left lane of the vehicle is requested, recognizing a lane change of a neighboring vehicle based on the projection information located in the region of interest, and controlling the vehicle based on the recognized lane change of the neighboring vehicle.

The recognizing of the projection information located in the region of interest corresponding to the driving direction of the vehicle may include: setting the region of interest in a right lane of the vehicle when a lane change to a right lane of the vehicle is requested, recognizing a lane change of a neighboring vehicle based on the projection information located in the region of interest, and controlling the vehicle based on the recognized lane change of the neighboring vehicle.

The recognizing of the projection information located in the region of interest corresponding to the driving direction of the vehicle may include: setting the region of interest in a forward driving lane of the vehicle when the vehicle is requested to drive in a forward direction of the vehicle, recognizing the projection information indicating that there is an a pedestrian in the region of interest, and controlling the vehicle based on the recognized presence of the pedestrian.

The recognizing of the projection information located in the region of interest corresponding to the driving direction of the vehicle may include: setting the region of interest in a forward driving lane of the vehicle when the vehicle is requested to drive in a forward direction of the vehicle, recognizing the projection information indicating that a stopped vehicle is located in the region of interest, and controlling the vehicle based on the recognition of the stopped vehicle in the ROI.

The classifying of the projection information located on the road surface may be performed based on a second CNN.

The artificial neural network-based projection information recognition apparatus may further include performing, by the object detecting device, learning on the object in the image, and pertaining, by the projection information classifying device, learning on the projection information located on the road surface.

The performing of the learning on the projection information located on the road surface may include distinguishing the projection information projected on the road surface from a mark painted on the road surface.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Further, in describing exemplary forms of the present disclosure, a detailed description of well-known features or functions will be ruled out in order not to unnecessarily obscure the gist of the present disclosure.

In describing the components of exemplary forms according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
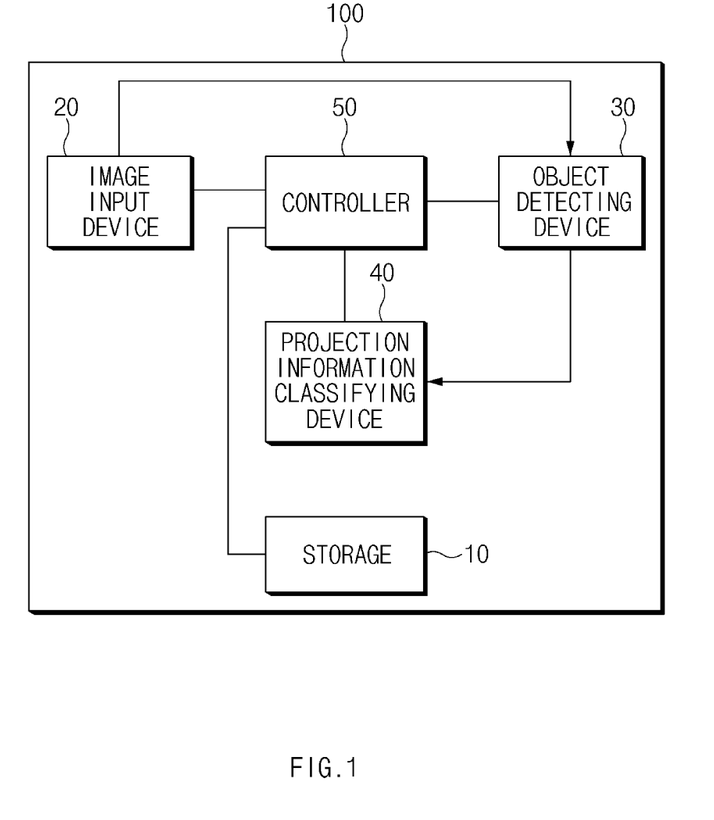
FIG. 1 is a configuration diagram of an artificial neural network-based projection information recognition apparatus.

FIG. 1 is a configuration diagram of an artificial neural network-based projection information recognition apparatus according to one form of the present disclosure.

Referring to FIG. 1, an artificial neural network-based projection information recognition apparatus 100 may include storage 10, an image input device 20, an object detecting device 30, a projection information classifying device 40, and a controller 50. In this case, according to methods of implementing the artificial neural network-based projection information recognition apparatus 100, components may be combined into one entity or some components may be omitted. In particular, the controller 50 may be implemented to perform both the functions of the object detecting device 30 and the projection information classifying device 40.

First, the storage 10 may store various kinds of logic, algorithms and programs desired in a process of learning the information (projection information) projected on a road surface by a neighboring vehicle based on an artificial neural network and recognizing information projected on a region of interest (ROI) corresponding to a driving direction of a host vehicle based on a result of learning.

The storage 10 may further store a result (e.g., an object model) acquired through learning by the object detecting device 30 and a result (e.g., a classification model) acquired through learning by the projection information classifying device 40.

The storage 10 may include at least one type of storage medium among a memory of a flash memory type, a hard disk type, a micro type, a card type (e.g., an SD card (Secure Digital Card) or an XD card (eXtream Digital Card)) and RAM (Random Access Memory), SRAM (Static RAM), ROM (Read Only Memory), PROM (Programmable ROM), EEPROM (Electrically Erasable PROM), a Magnetic RAM (MRAM), a magnetic disk, and an optical disk type memory.

Next, the image input device 20 may be implemented with a camera, for example, and may input an image (e.g., a digital image signal) to the object detecting device 30. In this case, the camera may include a front camera for photographing a forward image of a vehicle, a left camera for photographing a left image of the vehicle, and a right camera for photographing a right image of the host vehicle. The left camera may include a left front camera for photographing a left forward field of view of the vehicle and a left rear camera for photographing a left rearward field of view of the vehicle. The right camera may include a right front camera for photographing right forward field of view of the vehicle and a right rear camera for photographing a right rearward field of view of the camera.

In the following form, the forward image of the vehicle photographed by the front camera will be described. For example, the forward image of the vehicle is as shown in FIG. 2.

Figure 2:
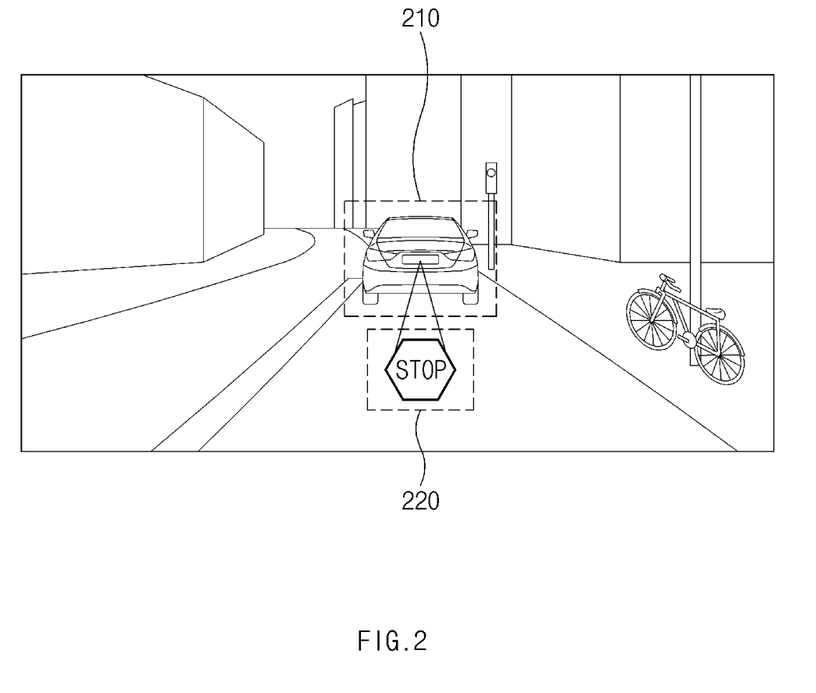
FIG. 2 is a diagram illustrating an example of a forward image of a vehicle input by an image input device included in an artificial neural network-based projection information recognition apparatus.

FIG. 2 is a diagram illustrating an example of a forward image of a vehicle input by an image input device included in an artificial neural network-based projection information recognition apparatus according to one form of the present disclosure.

Referring to FIG. 2, a preceding vehicle 210 in the same lane as the vehicle has stopped in the forward image of the vehicle. In this case, the preceding vehicle 210 may project a mark 220 indicating the stop onto a rearward road surface of the preceding vehicle 210. In the disclosure, the mark 220 is merely an example, and may be embodied in various forms. In addition, the size, shape, and color of characters included in the mark 220 may be variously embodied.

The image input device 20 may input a plurality of forward images to the object detecting device 30 during learning of the object detecting device 30 and, when being mounted on the vehicle, input forward images of the vehicle which are acquired in real time to the object detecting device 30.

Next, the object detecting device 30 may detect an object in an image received from the image input device 20 based on a Convolution Neural Network (CNN) that is one of artificial neural networks The object detected as described above is, for example, as shown in FIG. 3E.

Figure 3A:
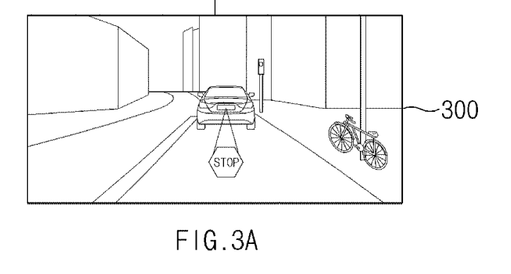
FIG. 3A is a diagram illustrating an example of a forward image of a vehicle input by an image input device included in an artificial neural network-based projection information recognition apparatus.
Figure 3B:
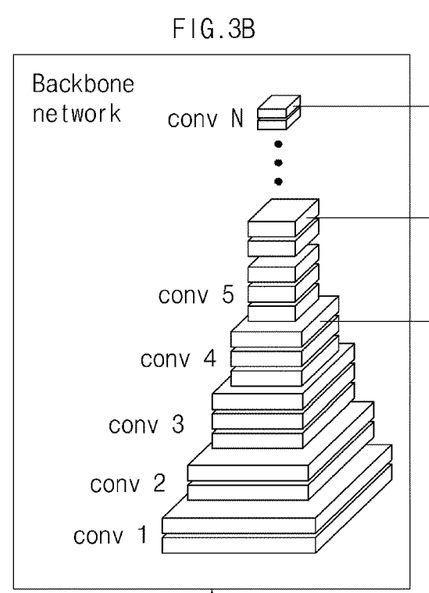
FIG. 3B is a diagram illustrating an example of a backbone network included in an artificial neural network-based projection information recognition apparatus.
Figure 3C:
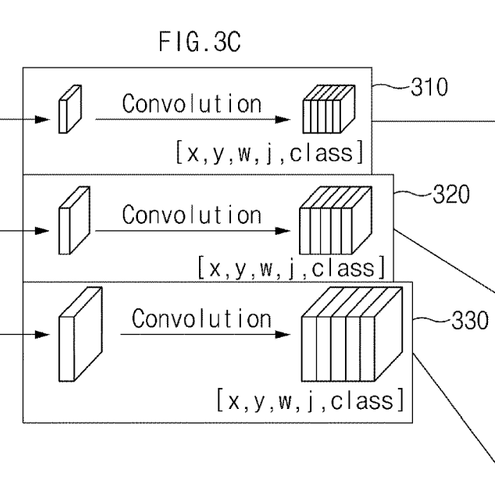
FIG. 3C is a diagram illustrating an example of a plurality of object detectors included in an artificial neural network-based projection information recognition apparatus.
Figure 3D:
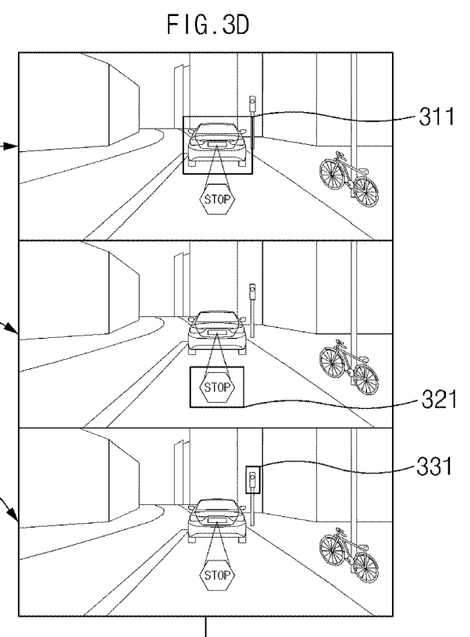
FIG. 3D is a diagram illustrating an example of each object detected by a plurality of object detectors included an object detecting device.
Figure 3E:
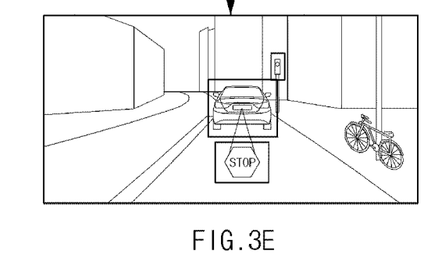
FIG. 3E is an exemplary diagram illustrating an object detected by an object detecting device included in an artificial neural network-based projection information recognition apparatus.

Referring to FIGS. 3A-3E, the object detecting device 30 included in the artificial neural network-based projection information recognition apparatus 100 may include a plurality of object detectors 310, 320, and 330 for detecting objects in an image (See, FIG. 3A-3C). Although three object detectors 310, 320, and 330 are described as an example for the sake of understanding, the number of object detectors may be added or subtracted according to a designer's intention, so that the present disclosure is not affected.

With reference to FIGS. 3C and 3D, the first object detector 310 may detect a vehicle in a forward image 300 of the vehicle based on the CNN. Reference numeral '311' may represent a result of the detection.

The second object detector 320 may detect projection information from the forward image 300 of the vehicle based on the CNN. Reference numeral '321' may represent a result of the detection.

The third object detector 330 can detect a traffic light on the forward image 300 of the vehicle based on the CNN. Reference numeral '331' may represent a result of the detection.

The plurality of object detectors 310, 320, and 330 may perform learning on an object in an image by repetitively performing the above-described process on a plurality of forward images. That is, the object detecting device 30 may perform learning on the object in the image in advance and generate an object model as a result of the learning.

On the other hand, the object detecting device 30 may perform learning on a left image photographed by a left camera. That is, the object detecting device 30 may perform learning on the object in the left image and generate an object model as a result of the learning. In this case, the object may include projection information indicating a right lane change which is projected by a neighboring vehicle (a vehicle in the vicinity of the host vehicle).

The object detecting device 30 may perform learning on the right image photographed by the right camera. That is, the object detecting device 30 may perform learning on an object in the right image and generate an object model as a result of the learning. In this case, the object may include projection information indicating a left lane change, which is projected by a neighboring vehicle.

Next, the projection information classifying device 40 may classify objects (pieces of projection information) located on a road surface among objects detected based on the CNN by the object detecting device 30.

Figure 4A:
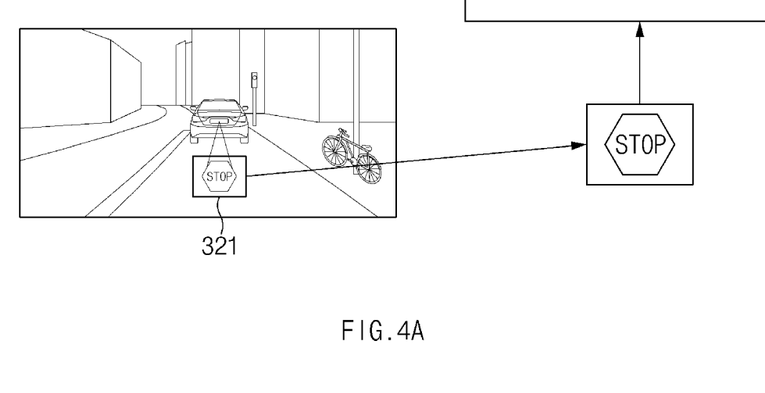
FIG. 4A is a diagram illustrating an example of an object detected by an object detector.
Figure 4B:
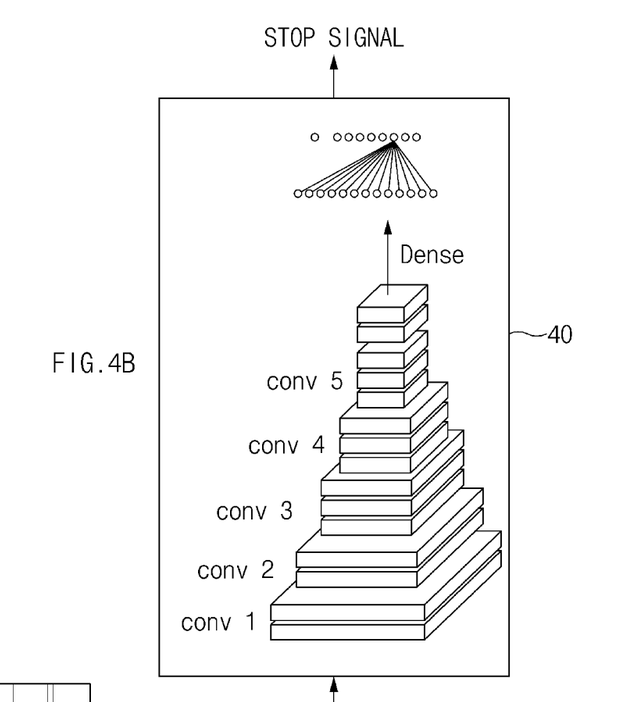
FIG. 4B is a diagram illustrating an example of a projection information classifying device included in an artificial neural network-based projection information recognition apparatus.

FIGS. 4A-4B are exemplary diagrams illustrating an object located on a road surface classified by a projection information classifying device included in an artificial neural network-based projection information recognition apparatus according to one form of the present disclosure.

As illustrated in FIG. 4B, the projection information classifying device 40 included in the artificial neural network-based projection information recognition apparatus 100 may classify projection Information of '321' (a stop notice mark projected on a rearward road surface by a preceding vehicle) as an object located on the road surface. In this case, the projection information classifying device 40 may classify the projection information of '321' as a 'stop signal'.

In the present disclosure, objects located on the road surface may include projection information (e.g., a stop notification mark projected on a rearward road surface by a preceding vehicle) located on the same lane as the vehicle (e.g., the host vehicle), projection information 511 and projection information 512 and the like.

The projection information classifying device 40 may perform learning on the projection information located on the road surface by repeatedly performing the above-described classification process on sample objects detected by the object detecting device 30. That is, the projection information classifying device 40 may learn the projection information located on the road surface in advance and generate a classification model as a result of the learning.

The CNN of the projection information classifying device 40 may be independent from the CNN of the object detecting device 30 and be able to be optimized for mutually specialized functions and to shorten the time desired for learning, but the present disclosure is not limited thereto.

The projection information classifying device 40 may distinguish a mark (projection information) projected on the road surface by the neighboring vehicle from a mark painted on the road surface through CNN-based learning. In this case, the controller 50 may periodically update CNN weights in the learning process such that the projection information classifying device 40 distinguishes the mark (projection information) projected on the road surface from the mark painted on the road surface based on brightness, colors, shapes, or the like.

The projection information classifying device 40 may classify a type of the mark projected on the road surface by the neighboring vehicle through CNN-based learning. In this case, the controller 50 may periodically update the CNN weights in the learning process so that the projection information classifying device 40 classifies a type of a mark projected on the road surface based on the brightness, colors, shapes, and the like.

Next, the controller 50 may perform overall control such that the respective components perform their functions normally. The controller 50 may be implemented in the form of hardware or software, or may be implemented in a combination of hardware and software. The controller 50 may be implemented with a microprocessor, but is not limited thereto.

The controller 50 may perform various types of control desired in a process of learning information (projection information) projected on the road surface by the neighboring vehicle based on the artificial neural network, and recognizing information projected on a region of interest (ROI) corresponding to the driving direction of the vehicle based on the learning.

The controller 50 may perform control desired in a process of detecting an object in an image received from the image input device 20 based on the CNN (Convolution Neural Network) in the object detecting device 30.

The controller 50 may perform control desired in the learning process of the object detecting device 30.

The controller 50 may perform control desired in the process of classifying objects (pieces of projection information) located on the road surface among the objects detected by the object detecting device 30 based on the CNN in the projection information classifying device 40.

The controller 50 may perform control desired in the learning process of the projection information classifying device 40.

The controller 50 may allow the projection information classifying device 40 to classify an object (projection information) located on the ROI among the objects (pieces of projection information) located on the road surface.

Meanwhile, the controller 50 may set a region of interest differently according to images input by the image input device 20.

Hereinafter, a process of setting a region of interest and a process of recognizing projection information in the region of interest and controlling a vehicle based on the recognized projection information will be described with reference to FIGS. 5 to 8.

Figure 5:
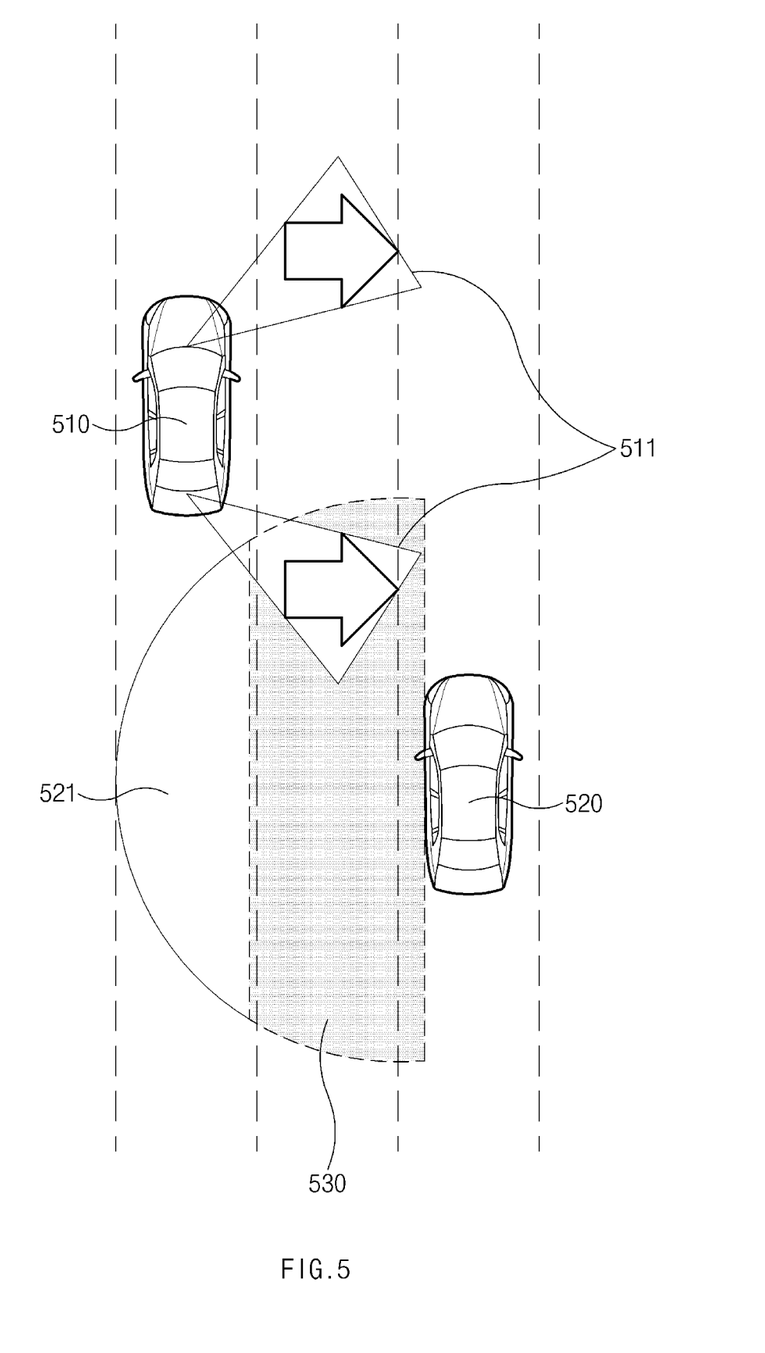
FIG. 5 is a diagram illustrating a process of recognizing first projection information by a controller included in artificial neural network-based projection information recognition apparatus.

FIG. 5 is a diagram illustrating a process of recognizing first projection information in a controller included in artificial neural network-based projection information recognition apparatus according to one form of the present disclosure.

In FIG. 5, reference numeral '520' denotes a vehicle (host vehicle) to which one form of the present disclosure is applied, and reference numeral '510' denotes a neighboring vehicle.

The controller 50 may allow the image input device 20 to input a left image in a situation where a lane change to a left lane of the vehicle 520 is desired.

The controller 50 may set a region of interest 530 in a left area 521 of the vehicle 520 because the image input through the image input device 20 is the left image photographed by a left camera. In this case, the controller 50 may set an area including the next lane of the vehicle 520 in the left area 521 to the region of interest 530 because the region of interest 530 is an area related to the lane change of the vehicle 520. The left area 521 may indicate a photographing area of the left camera.

The neighboring vehicle 510 may project projection information 511 indicating the lane change on the right road surface for right lane change. In this case, the shape, color, and size of the projection information 511 may be changed according to a designer's intention.

The controller 50 may allow the projection information classifying device 40 to classify the information 511 projected on the region of interest 521, recognize the projection information classified by the projection information classifying device 40, and control the vehicle based on the projection information. In this case, when the left lane change of the vehicle 520 is requested in the state where the right lane change of the neighboring vehicle 510 is recognized, the controller 50 may allow the vehicle to delay the lane change or slow down and attempt the lane change.

Figure 6:
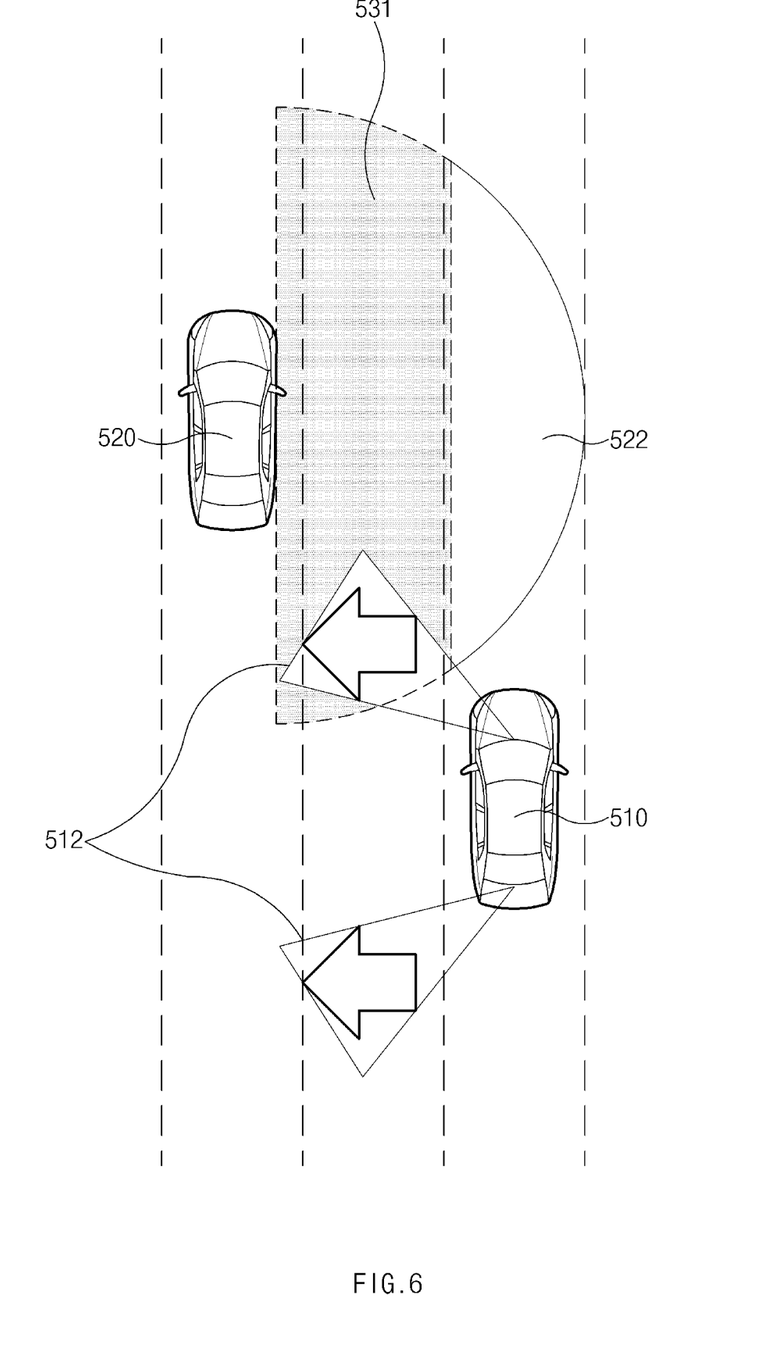
FIG. 6 is a diagram illustrating a process of recognizing second projection information by a controller included in artificial neural network-based projection information recognition apparatus.

FIG. 6 is a diagram illustrating a process of recognizing second projection information in a controller included in artificial neural network-based projection information recognition apparatus according to one form of the present disclosure.

As shown in FIG. 6, the controller 50 may allow the image input device 20 to input a right image in a situation in which a lane change to the right lane of the vehicle 520 is desired.

The controller 50 may set a region of interest 531 in a right area 522 of the vehicle 520 because the image input through the image input device 20 is the right image photographed by a right camera. In this case, the controller 50 may set an area including the next lane of the vehicle 520 in the right area 531 to the region of interest 531, because the region of interest 531 is an area related to the lane change of the vehicle 520. The right area 522 may represent a photographing area of the right camera.

The controller 50 may set '522' located on the right side of the vehicle 520 to the region of interest, because the image input through the image input device 20 is the right image photographed by the right camera. In this case, the controller 50 may allow the image input device 20 to input the right image because the right lane change of the vehicle 520 is requested.

The neighboring vehicle 510 may project projection information 512 indicating the lane change on the left road surface for left lane change. In this case, the shape, color, and size of the projection information 512 may be changed according to a designer's intention.

The controller 50 may allow the projection information classifying device 40 to classify the information 512 projected on the region of interest 522, recognize the projection information classified by the projection information classifying device 40, and control the vehicle based on the projection information. In this case, when the right lane change of the vehicle 520 is requested in a state where the left lane change of the neighboring vehicle 510 is recognized, the controller 50 may allow the vehicle to delay the lane change or slow down and attempt the lane change.

Figure 7:
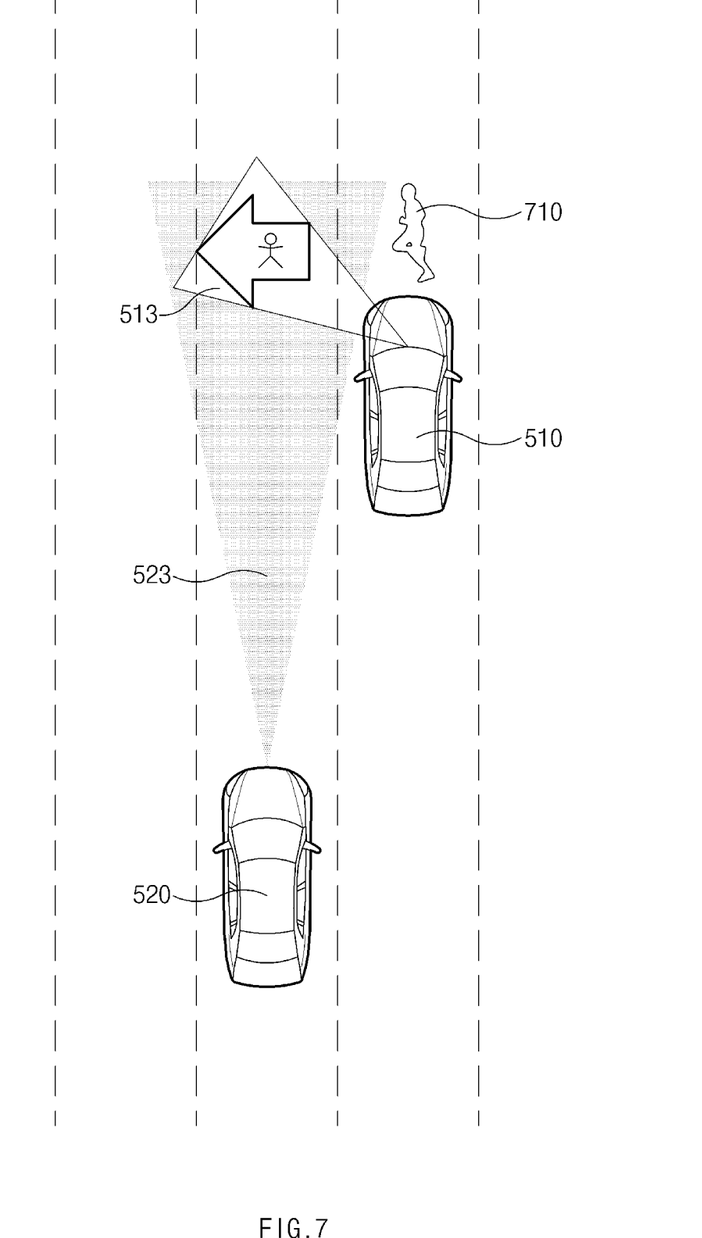
FIG. 7 is a diagram illustrating a process of recognizing third projection information by a controller included in artificial neural network-based projection information recognition apparatus.

FIG. 7 is a diagram illustrating a process of recognizing third projection information in a controller included in artificial neural network-based projection information recognition apparatus according to one form of the present disclosure.

Referring to FIG. 7, the controller 50 may allow the image input device 20 to input a forward image in a situation where the vehicle 520 is requested to drive straight.

The controller 50 may set a region of interest in a front area 523 of the vehicle 520 because the image input through the image input device 20 is the forward image photographed by a front camera. In this case, the controller 50 may set the same area as the driving lane of the vehicle 520 in the front area 523 to the region of interest. Further, the front area 523 may represent a photographing area of the front camera.

The neighboring vehicle 510 may detect that there is a pedestrian ahead and project projection information 513 indicating that there is a pedestrian on the road surface of the left lane or the road surface of the right lane. In this case, the shape, color, and size of the projection information 513 may be changed according to a designer's intention.

The controller 50 may allow the projection information classifying device 40 to classify the information 513 projected on the region of interest 523, recognize the projection information classified by the projection information classifying device 40, and control the vehicle based on the projection information. In this case, the controller 50 may allow the vehicle to slow down when the neighboring vehicle 510 is requested to drive straight.

Figure 8:
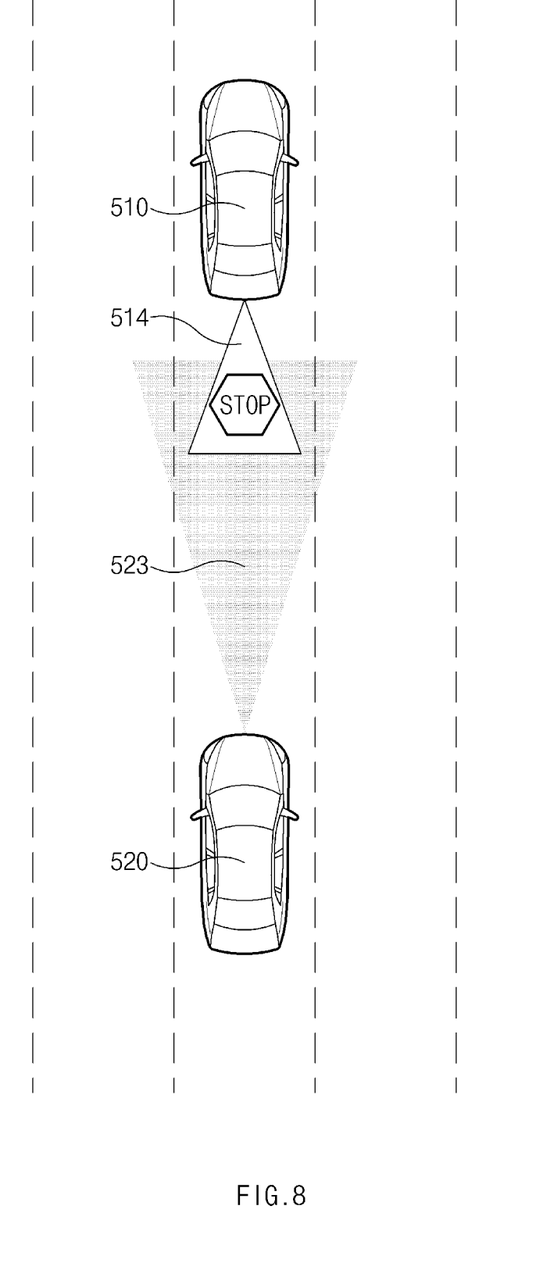
FIG. 8 is a diagram illustrating a process of recognizing fourth projection information by a controller included in artificial neural network-based projection information recognition apparatus.

FIG. 8 is a diagram illustrating a process of recognizing fourth projection information in a controller included in artificial neural network-based projection information recognition apparatus according to one form of the present disclosure.

Referring to FIG. 8, the controller 50 may allow the image input device 20 to input a forward image in a situation where the vehicle 520 is requested to drive straight.

The controller 50 may set a region of interest in a front region 523 of the vehicle 520 because the image input through the image input device 20 is the forward image photographed by a front camera. In this case, the controller 50 may set the same area as the driving lane of the vehicle 520 in the front area 523 to a region of interest.

The neighboring vehicle 510 may project projection information 514 indicating the stop on the rearward road surface to indicate the stop. In this case, the shape, color, and size of the projection information 514 may be changed according to a designer's intention.

The controller 50 may allow the projection information classifying device 40 to classify the information 514 projected on the region of interest 523, recognize the projection information classified by the projection information classifying device 40, and control the vehicle based on the projection information. In this case, the controller 50 may allow the vehicle to slow down when the neighboring vehicle 510 is requested to drive straight.

Figure 9:
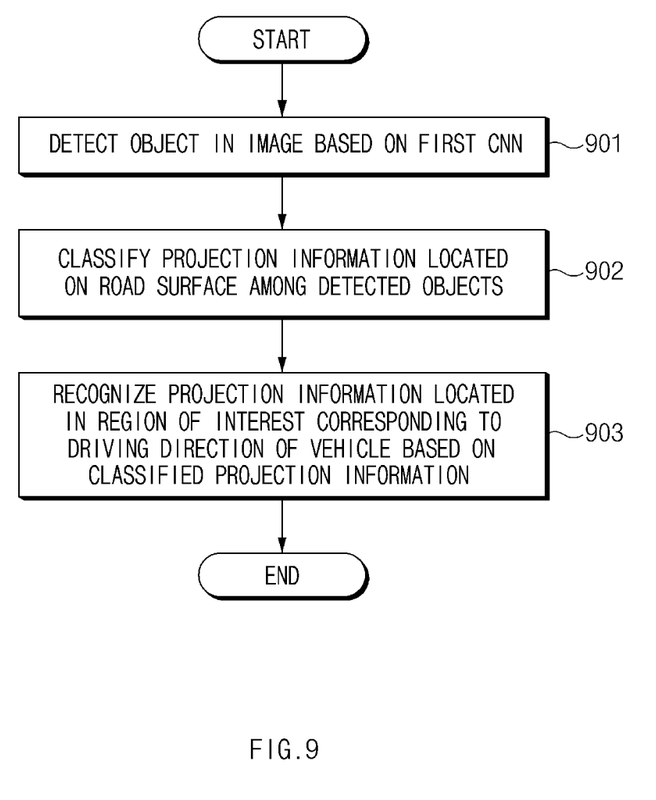
FIG. 9 is a flowchart illustrating an artificial neural network-based projection information recognition method.

FIG. 9 is a flowchart illustrating an artificial neural network-based projection information recognition method according to another form of the present disclosure.

First, the object detecting device 30 may detect an object in an image based on a first CNN (Convolution Neural Network) (901).

Thereafter, the projection information classifying device 40 may classify projection information located on a road surface among objects detected by the object detecting device 30 (902).

Then, the controller 50 may recognize the projection information located in the ROI corresponding to the driving direction of the vehicle based on the projection information classified by the projection information classifying device 40 (903).

Figure 10:
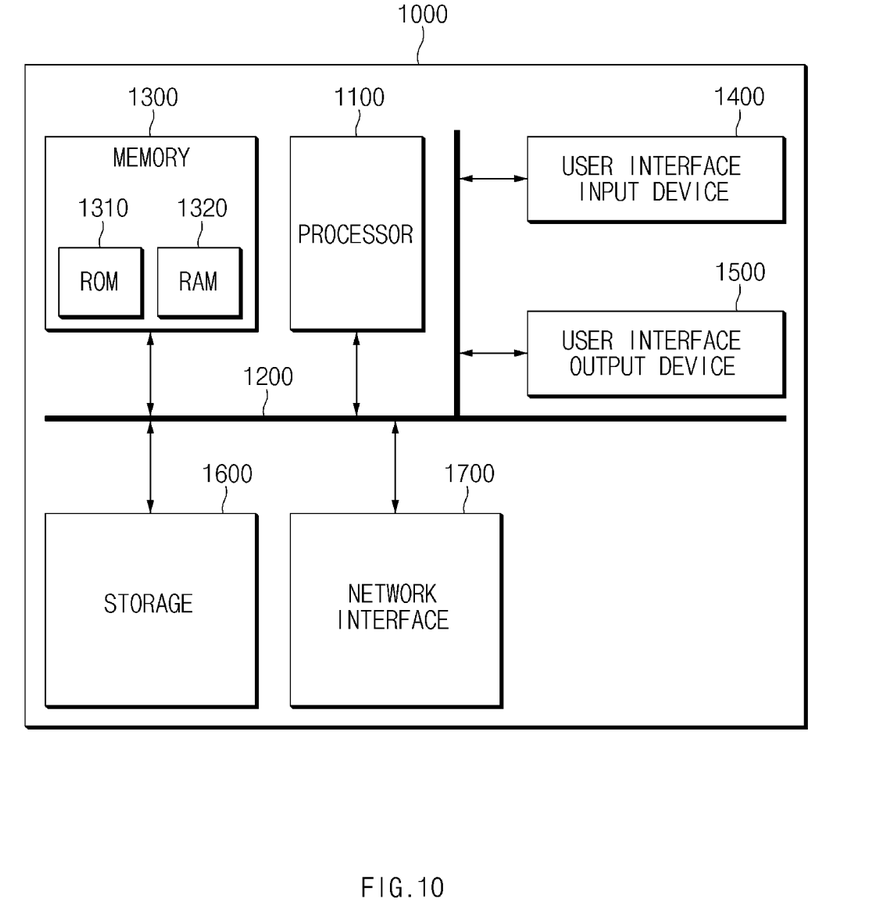
FIG. 10 is a diagram illustrating a computing system for performing an artificial neural network-based projection information recognition method.

FIG. 10 is a diagram illustrating a computing system for performing an artificial neural network-based projection information recognition method according to one form of the present disclosure.

Referring to FIG. 10, the artificial neural network-based projection information recognition method may be implemented through a computing system. A computing system 1000 may include at least one processor 1100, a memory 1300, a user interface input device 1400, a user interface output device 1500, storage 1600, and a network interface 1700, which are connected with each other via a system bus 1200.

The processor 1100 may be a central processing device (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the forms disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a solid state drive (SSD) a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

According to the artificial neural network-based projection information recognition apparatus and method, it is possible to learn information (projection information) projected on a road surface by a neighboring vehicle based on an artificial neural network and recognize information projected on a region of interest (ROI) corresponding to a driving direction of a vehicle based on the learning, thus improving driving safety of the vehicle.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary forms of the present disclosure are provided to explain the spirit and scope of the present disclosure, but not to limit them, so that the spirit and scope of the present disclosure is not limited by the forms. The scope of the present disclosure should be construed on the basis of the accompanying claims, and all the technical ideas within the scope equivalent to the claims should be included in the scope of the present disclosure.

What is claimed is:

1. An artificial neural network-based projection information recognition apparatus, comprising:
   non-transitory memory storing instructions executed by a processor; and
   the processor configured to execute the instructions to:
   detect a plurality of objects in an image based on a first Convolution Neural Network (CNN);
   classify a plurality of projection information located on a road surface among the plurality of objects; and
   recognize projection information located in a Region Of Interest (ROI) corresponding to a driving direction of a vehicle among the plurality of projection information,
   wherein the plurality of projection information represents information projected on the road surface by a plurality of neighboring vehicles.

2. The artificial neural network-based projection information recognition apparatus of claim 1, wherein the processor is configured to set the ROI in a left lane of the vehicle when a lane change to the left lane of the vehicle is requested.

3. The artificial neural network-based projection information recognition apparatus of claim 2, wherein the processor is configured to delay a timing of the lane change or reduce a speed of the vehicle before attempting the lane change when the projection information indicating a lane change from a neighboring vehicle of the plurality of neighboring vehicles is located in the ROI.

4. The artificial neural network-based projection information recognition apparatus of claim 1, wherein the processor is configured to set the ROI in a right lane of the vehicle when a lane change to a right lane change of the vehicle is requested.

5. The artificial neural network-based projection information recognition apparatus of claim 4, wherein the processor is configured to delay a timing of the lane change or reduce a speed of the vehicle before attempting the lane change when the projection information indicating a lane change from a neighboring vehicle of the plurality of neighboring vehicles is located in the ROI.

6. The artificial neural network-based projection information recognition apparatus of claim 1, wherein the processor is configured to set the ROI in a forward driving lane of the vehicle when the vehicle is requested to drive in a forward direction of the vehicle.

7. The artificial neural network-based projection information recognition apparatus of claim 6, wherein the processor is configured to reduce a speed of the vehicle when the projection information indicates that a pedestrian is present in the ROI.

8. The artificial neural network-based projection information recognition apparatus of claim 6, wherein the processor is configured to reduce a speed of the vehicle when the projection information indicates that a stopped vehicle is located in the ROI.

9. The artificial neural network-based projection information recognition apparatus of claim 1, wherein the processor is configured to perform learning on the object in the image.

10. The artificial neural network-based projection information recognition apparatus of claim 1, wherein the processor is configured to classify the plurality of projection information located on the road surface based on a second CNN.

11. The artificial neural network-based projection information recognition apparatus of claim 1, wherein the processor is configured to perform learning on the plurality of projection information located on the road surface.

12. The artificial neural network-based projection information recognition apparatus of claim 11, wherein the processor is configured to distinguish the plurality of projection information projected on the road surface from a mark painted on the road surface in a learning process.

13. An artificial neural network-based projection information recognition method, comprising:
    detecting, by a processor, a plurality of objects in an image based on a first Convolution Neural Network (CNN);
    classifying, by the processor, a plurality of projection information located on a road surface among the plurality of objects; and
    recognizing, by the processor, projection information located in a Region Of Interest (ROI) corresponding to a driving direction of a vehicle among the plurality of projection information,
    wherein the plurality of projection information represents information projected on the road surface by a plurality of neighboring vehicles.

14. The artificial neural network-based projection information recognition method of claim 13, wherein recognizing the projection information located in the ROI includes:
    setting the ROI in a left lane of the vehicle when a lane change to the left lane of the vehicle is requested;

recognizing a lane change from a neighboring vehicle of the plurality of neighboring vehicles based on the projection information located in the ROI; and controlling the vehicle based on the recognized lane change.

15. The artificial neural network-based projection information recognition method of claim 13, wherein recognizing the projection information located in ROI includes:

setting the ROI in a right lane of the vehicle when a lane change to a right lane of the vehicle is requested;

recognizing a lane change from a neighboring vehicle of the plurality of neighboring vehicles based on the projection information located in the ROI; and controlling the vehicle based on the recognized lane change.

16. The artificial neural network-based projection information recognition method of claim 13, wherein recognizing the projection information located in the ROI includes:

setting the ROI in a forward driving lane of the vehicle when the vehicle is requested to drive in a forward direction of the vehicle;

recognizing the projection information indicating that a pedestrian is present in the ROI; and controlling the vehicle based on the recognized presence of the pedestrian.

17. The artificial neural network-based projection information recognition method of claim 13, wherein recognizing the projection information located in the ROI includes:

setting the ROI in a forward driving lane of the vehicle when the vehicle is requested to drive in a forward direction of the vehicle;

recognizing the projection information indicating that a stopped vehicle is located in the ROI; and controlling the vehicle based on the recognition of the stopped vehicle in the ROI.

18. The artificial neural network-based projection information recognition method of claim 13, wherein classifying the plurality of projection information located on the road surface is performed based on a second CNN.

19. The artificial neural network-based projection information recognition method of claim 13, further comprising:

performing, by the processor, learning on the object in the image; and performing, by the processor, learning on the plurality of projection information located on the road surface.

20. The artificial neural network-based projection information recognition method of claim 19, wherein performing the learning on the plurality of projection information located on the road surface includes:

distinguishing the plurality of projection information projected on the road surface from a mark painted on the road surface.

* * * * *